May 30, 1961 J. L. GROVE 2,986,421
AIR-OPERATED HOOK
Filed Oct. 7, 1958 3 Sheets-Sheet 1
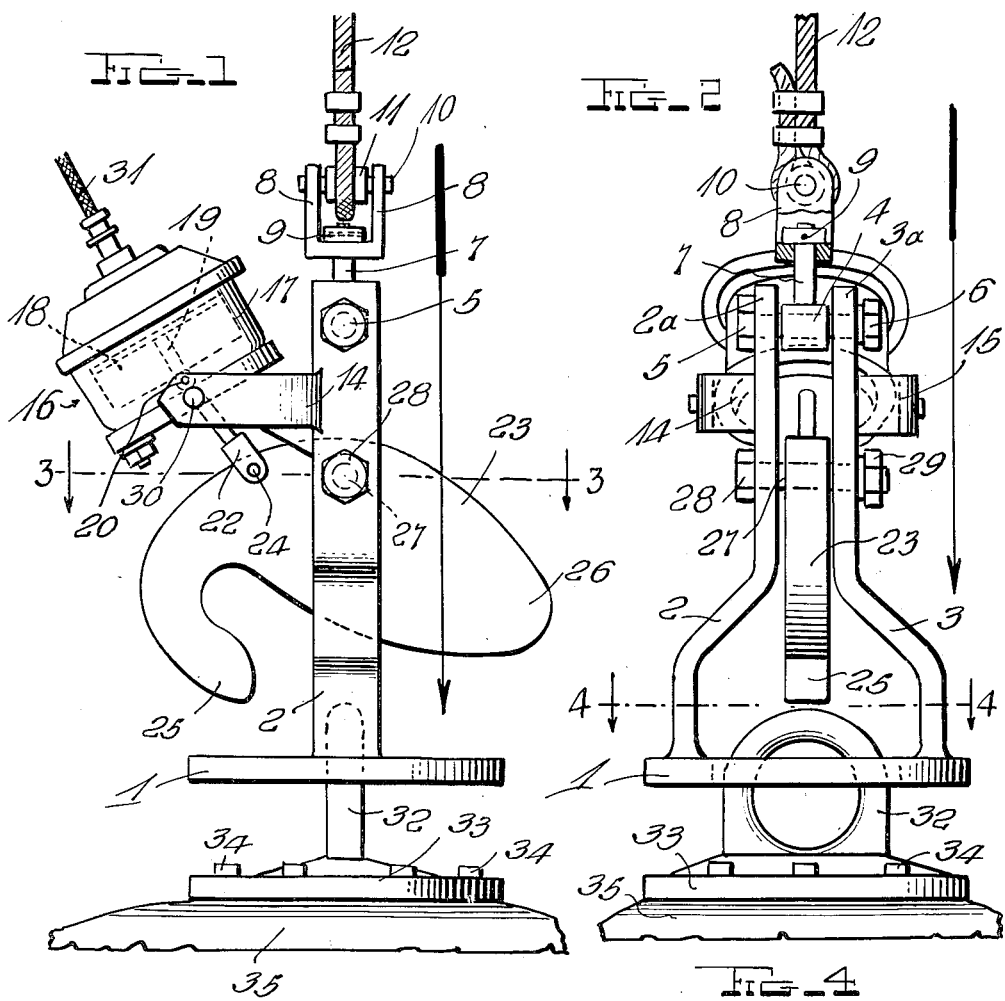
INVENTOR
John L. Grove,
BY John B. Brady
ATTORNEY May 30, 1961 J. L. GROVE 2,986,421
AIR-OPERATED HOOK
Filed Oct. 7, 1958 3 Sheets-Sheet 2
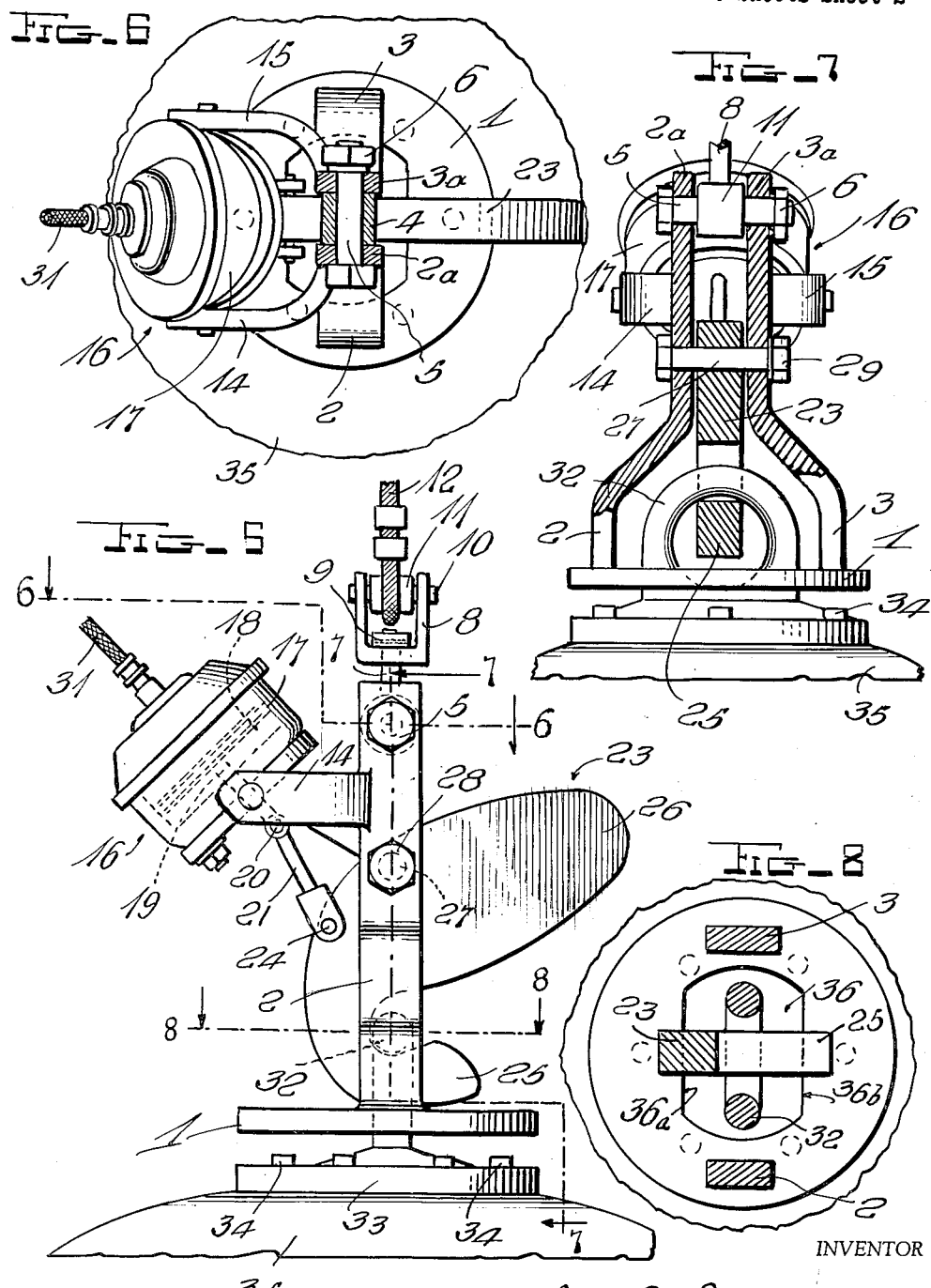
INVENTOR
John L. Grove,
BY John B. Brady
ATTORNEY May 30, 1961 J. L. GROVE 2,986,421
AIR-OPERATED HOOK
Filed Oct. 7, 1958 3 Sheets-Sheet 3
FIG_9
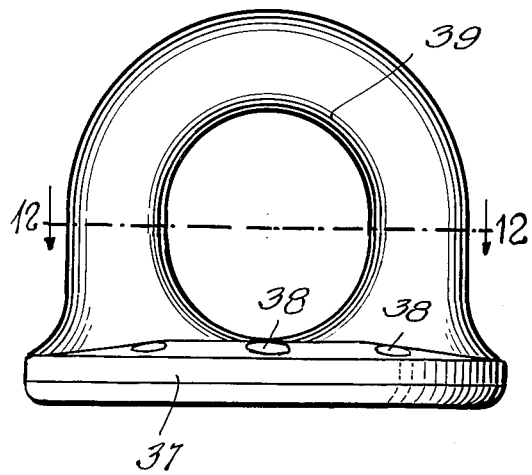
FIG_10
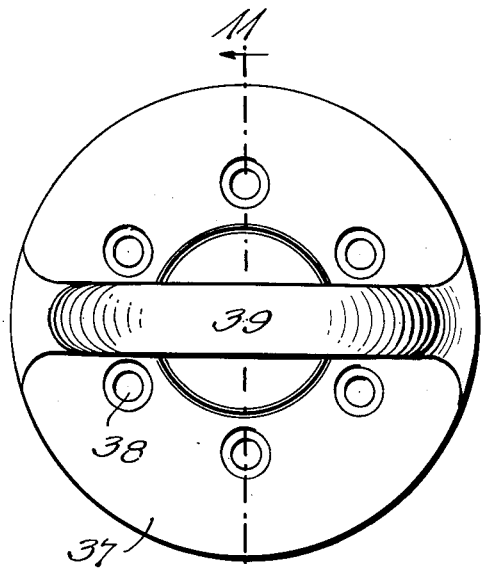
FIG_11
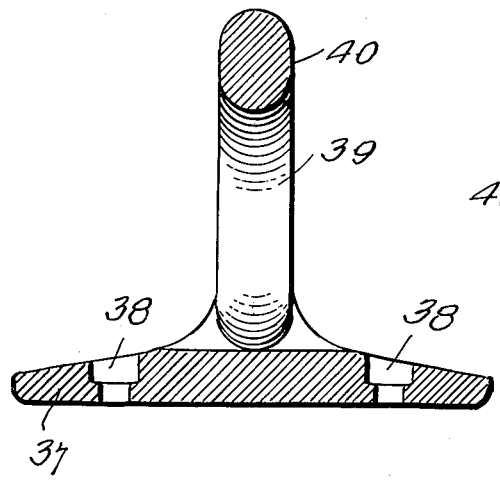
FIG_12
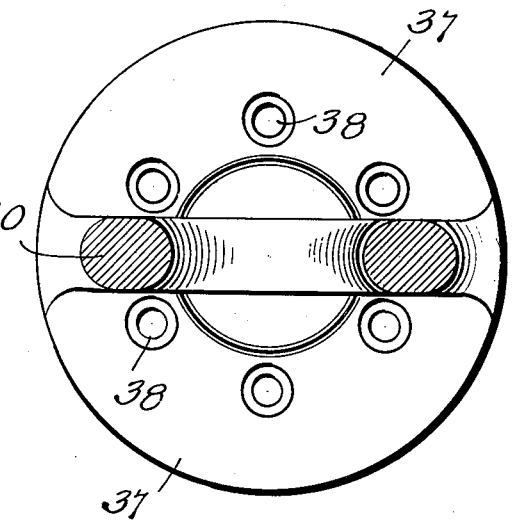
INVENTOR
John L. Grove,
BY John B. Brady
ATTORNEY United States Patent Office 2,986,421
Patented May 30, 1961

2,986,421
AIR-OPERATED HOOK
John L. Grove, Shady Grove, Pa.
(171 Apple Drive, Greencastle, Pa.)
Filed Oct. 7, 1958, Ser. No. 765,874
3 Claims. (Cl. 294—82)

My invention relates broadly to hoists and more particularly to a construction of self-centering orientable air operated lifting hook.

One of the objects of my invention is to provide a construction of self-centering air operated lift hook for hoists having means for orienting the hook with respect to a hoisting eye for effecting a connection between the hook and the eye.

Another object of my invention is to provide a construction of air operated hook in which the hook forms part of a counterweight which is dynamically balanced to require a minimum of effort from an air operated unit for moving the hook to a latching or unlatching position.

Still another object of my invention is to provide a construction of air operated hook were the hook is formed integral with a counterweight for dynamically balancing the hook with respect to a pivot so that the hook may be readily moved to a latching or unlatching position under air control.

A further object of my invention is to provide an arrangement for mounting an air operated hook for automatic hooking and unhooking operation having means for self-centering the hook with respect to the load hoisting eye for presenting or withdrawing the hook with respect to the hoisting eye under air control.

Other and further objects of my invention reside in the mounting arrangement for a self-centering air operated hook as set forth more fully in the specification hereinafter following by reference to the accompanying drawings in which:

Fig. 1 is a side elevational view of the mounting frame and air operated hook of my invention illustrating the frame being lowered into position for engagement of a load hoisting eye attached to a load;

Fig. 2 is a front elevational view of the mounting frame and air operated hook being lowered into position for engagement of the hoisting eye by the air operated hook;

Fig. 3 is a horizontal sectional view taken substantially on line 3—3 of Fig. 1;

Fig. 4 is a horizontal sectional view taken substantially on line 4—4 of Fig. 2;

Fig. 5 is a side elevational view of the mounting frame and air operated hook similar to the view shown in Fig. 1 but illustrating the engagement of the hoisting eye by the air operated hook after completion of a self-centering operation;

Fig. 6 is a horizontal sectional view taken substantially on line 6—6 of Fig. 5 and illustrating the air operated cylinder in top plan view;

Fig. 7 is a vertical sectional view taken substantially on line 7—7 of Fig. 5 with certain of the parts illustrated in elevation;

Fig. 8 is a horizontal sectional view taken substantially on line 8—8 of Fig. 5;

Fig. 9 is a side elevational view of a preferred construction of forged hoisting eye used with the self-centering air operated hook of my invention;

Fig. 10 is a top plan view of the hoisting eye shown in Fig. 9;

Fig. 11 is a vertical sectional view taken on line 11—11 of Fig. 10 and

Fig. 12 is a horizontal sectional view through the hoisting eye on line 12—12 of Fig. 9.

My invention is directed to a compact construction of self-centering air operated hook which may be lowered into position over the hoisting eye of a load and oriented into a position for presenting or withdrawing the air operated hook with respect to the hoisting eye. I construct the air operated hook so that it is dynamically balanced and requires a minimum of effort from an air operated cylinder to move the hook into engaging position with a hoisting eye or for withdrawing the hook from an engaged position. The hook employed in my invention is formed integral with a counterweight and the hook is pivotally mounted at its center of gravity so that the hook may be angularly moved from a disengaged position to an engaged position or withdrawn from an engaged position for release of the eye with minimum effort at the air operated cylinder unit of the device. Self orientation of the frame which mounts the hook is effected by the camming engagement of a slot at the base of the frame with sides of the hoisting eye by which the air operated hook is presented in a plane extending substantially normal to the plane of the hoisting eye, enabling the hook to slip through the hoisting eye and effect an engagement automatically for raising a load. The slotted engagement of the frame with the hoisting eye assures the maintenance of the hook in a plane substantially normal to the plane of the hoisting eye so that disengagement of the air operated hook from the hoisting eye may be effected with the expenditure of minimum effort by the air operated cylinder. The air operated cylinder unit is a piston operated device in which compressed air is supplied to a cylinder in which the piston moves. The piston is displaced in the cylinder upon admission of air through an air compressor hose. A linkage interconnecting the piston with the air operated hook effects angular movement of the air operated hook for engaging or disengaging the hook with respect to the hoisting eye.

Referring to the drawings in more detail, reference character 1 designates the base of the frame of a support for the air operated hook. The base 1 has a pair of upwardly extending standards 2 and 3 connected therewith in diametrically opposite positions on the base 1. The standards 2 and 3 are angularly bent toward each other and terminate in parallel extending portions 2a and 3a shown more clearly in Figs. 2, 3, 6, and 7. The upper ends of the portions 2a and 3a of the standards 2 and 3 are spaced by means of a sleeve 4 which fits over the bolt 5 which passes through the upper portions 2a and 3a of standards 2 and 3 and is secured in position by fastening nut 6. The sleeve 4 serves as the head of a suspension link shown at 7 which fits through the substantially inverted U-shaped member 8 and is secured thereto by fastening nut 9. The substantially inverted U-shaped member 8 has a transversely extending pin 10 having an enlarged spacing sleeve 11 thereon disposed between the upper extremities of the side portions of the substantially inverted U-shaped member 8 and around which the hoist cable 12 is secured for raising or lowering the frame.

The frame constituted by standards 2 and 3 is provided with a pair of transversely extending arms 14 and 15 which extend outwardly from the parallel extending portions 2a and 3a intermediate the parallel extending portions 2a and 3a of the standards 2 and 3 and serve as means for journaling the air operated unit shown generally at 16. The air operated unit 16 consists of a cylinder 17 within which piston 18 is mounted for lineal displacement. The piston 18 connects with a piston rod 19 which projects beyond the closed end of cylinder 17 and is pivotally connected as indicated at 20 to the link 21. Link 21 connects to a yoke 22, which embraces opposite sides of the dynamically balanced hook shown generally at 23. Yoke 22 is fastened to the rear portion of the hook 23 by pivot 24. The hook 23 comprises an integrally formed body terminating at one end in the engaging hook 25 and terminating in the opposite end in the counterweight 26. At the center of gravity of the hook intermediate the counterweight 26 and the engaging hook 25 I provide a pivot shown at 27 formed by bolt member 28 which passes through the lineal portion 2a of standard 2, through the center of gravity 27 of the hook 23 and through the lineally portion 3a of standard 3, where it is fastened by nut 29. The cylinder 17 of the air operated unit 16 is pivoted at 30 in the arms 14 and 15 so that the air operated unit is free to change its angle of tilt as the piston rod 19 moves in and out of cylinder 17. Air is admitted to cylinder 17 through flexible hose 31 which remains connected with the air operated unit as the frame constituted by base 1 and standards 2 and 3 is raised or lowered with respect to the hoisting eye fastened to the load.

In Figs. 1, 2, 4, 5, 7, and 8 I have illustrated the hoisting eye generally by reference character 32 connected with the fastening plate 33 which is secured to the load by attachment bolts 34. In the particular embodiment illustrated in the form of my invention shown in Figs. 1–8, the load consists of a flexible collapsible container 35 to which the hoisting eye 32 is fastened. In such arrangements the hoisting eye 32 is often disposed at an angle difficult to maneuver into engaging position. The structure of my invention eliminates such difficulties by reason of the structure of the base 1. I provide in base 1 a centrally disposed diametrically extending slot 36 which is elongated in one direction and foreshortened in the opposite direction. The elongated portion of slot 36 admits the hoisting eye 32 as represented in Fig. 4 whereas the foreshortened portion of slot 36 blocks the entry of eye 32. Any diagonal portion of slot 36 admits eye 32. Thus when base 1 is lowered upon eye 32 the two lineally extending parallel spaced edges of slot 36 shown at 36a and 36b engage the sides of eye 32, whereupon eye 32, being stationary, operates as a cam against the edges 36a and 36b angularly orienting the frame horizontally about the swivel constituted by the inverted U-shaped member 8 and the suspension link 7, enabling the frame to automatically shift around the hoisting eye 32 so that the engaging hook 25 is presented in a direction normal to the plane of hoisting eye 32 or substantially so, sufficient for the engaging hook 25 to enter the hoisting eye as shown in Figs. 5, 7, and 8. This orientation is automatic and the engaging hook 25 finds the eye by the angular shifting of the hook due to the gravitation of the slotted base 1 onto the hoisting eye in the proper position for entry of the engaging hook through the hoisting eye. The distribution of mass of the hook 23 is such that the counterweight 26 controls the movement of engaging hook 25 about the pivot 27 with minimum expenditure of effort by the air operated unit 16.

I prefer to employ the construction of hoisting eye shown in Figs. 9–12 wherein the circular base of the hoisting eye shown at 37 is provided with a plurality of distributed counterbored openings 38 through which fastening screws are passed to engage the top of the container. The hoisting eye and base are forged from steel and then hot-dipped to galvanize the eye. This eye is subjected to very high load stresses and is forged to withstand 30,000 pounds stress. The eye is vertically elongated as represented at 39 in Figs. 9 and 11 and the section of the eye is substantially oval or elliptical as represented at 40 in Figs. 11 and 12 facilitating entry of the engaging hook 25 as the base 1 orients about the hoisting eye to present the engaging hook 25 in a direction which is substantially normal to the plane of the hoisting eye. The elongation of the hoisting eye in a vertical direction as shown in Figs. 9–12 provides considerable advantage over the circular arrangement of the eye as represented in Figs. 1–8, but both forms may be used. The self-orienting frame for the air operated hook is particularly advantageous where the hoisting eye may be canted or leaning slightly in an angular direction, which is often the case in flexible containers. The orienting slot in the frame structure of the air operated hook, according to my invention, locates the hoisting eye and gravitates over the eye in such an angular position that the engaging hook 25 is aligned with the eye for entry therein and elevation of the load. I have found the invention very practical in raising collapsible containers which hold an average of 9,000 pounds of material such as carbon black, for example, where the flexible container is often of such irregular shape at the top thereof that the hoisting eye fastened thereto slants at such an angle that the self orientation of the frame of the air operated hook is sometimes difficult to effect. Such orientation, however, can be successfully accomplished using the structure of my invention and the engaging hook automatically engaged through the hoisting eye for raising the load.

The air operated unit 16 contains a spring bias means behind piston 18 which maintains the hook normally in the position illustrated in Fig. 1. That is to say the hook is normally biased to open position. The air pressure supplied through hose 31 enters the cylinder 17 against piston 18 and displaces piston 18 against the mass of the hook and the bias provided by the spring within the cylinder 17 and against which piston 18 must move for moving the hook 23 to engaged position. When once engaged the hook becomes self-locking with the weight of the hook hanging on the eye so that the hook cannot become disengaged. In order to disengage the hook it is necessary to physically move the weight 26 from the position illustrated in Fig. 5 to the position illustrated in Fig. 1 with the aid of the spring within cylinder 17 which facilitates restoration of piston 18 to the position preparatory to a successive displacement operation. The hook is closed by air pressure and opened by a spring enclosed in air chamber behind the piston, which insures a controlled amount of pressure being applied on the release; so that the cam action on the tip of the hook cannot be withdrawn thru the eye unless practically all the weight is removed from the eye and the eye is permitted to raise slightly.

While I have described my invention in certain preferred embodiments, I realize that modifications may be made and I desire that it be understood that no limitations upon my invention are intended other than may be imposed by the appended claims.

What I claim as new and desire to secure by Letters Patent of the United States, is as follows:

1. An air operated hook comprising a frame structure having a base structure extending in a substantially horizontal plane and a pair of standards projecting upwardly in spaced positions from opposite sides of the top of said base structure, means for swivelly suspending said frame structure from the upper ends of said standards, an elongated slot formed in said base structure in a position between said standards, a hook pivoted between said standards substantially above the plane of said base structure and swingable in a path directly over said elongated slot for engagement with a hoisting eye, an air operated unit pivotally mounted with respect to said standards, reciprocative means extending from said air operated unit and connected with said hook for moving said hook about the pivot thereof, and means for dynamically balancing said hook for movement between said standards, said frame structure being supportable either from said base structure or from said means for swivelly suspending said frame structure from the upper ends of said standards.

2. An air operated hook as set forth in claim 1 in which the elongated diametrically extending aperture in said base structure includes a pair of spaced parallel extending guiding edge portions and a pair of opposite curved guiding end edge portions, said parallel extending edge portions being spaced for a distance less than the external diameter of the hoisting eye with which said base structure coacts whereby the said parallel extending edge portions, in contacting the sides of the coacting hoisting eye, orient the base structure and the frame structure connected therewith to a position presenting the engaging end of the hook in a plane substantially normal to the plane of the coacting hoisting eye for facilitating the engagement of the hook through the hoisting eye.

3. An air operated hook as set forth in claim 1 in which said air operated unit pivotally mounted with respect to said standards is supported by a pair of arms extending from said standards in a direction substantially parallel with the plane of said base structure and in a position above the pivot of said hook on said standards, the pivot for said air operated unit being centered in the extremities of said arms substantially offset from a central axis through said standards.

References Cited in the file of this patent

UNITED STATES PATENTS

| | | |
|---|---|---|
| 644,633 | Penticoff | Mar. 6, 1900 |
| 992,746 | Ashdown | May 23, 1911 |
| 1,749,379 | Hinderliter | Mar. 4, 1930 |
| 2,368,671 | Lombard | Feb. 6, 1945 |
| 2,519,285 | Rhoads | Aug. 15, 1950 |
| 2,576,705 | Spitz | Nov. 27, 1951 |

FOREIGN PATENTS

| | | |
|---|---|---|
| 149,041 | England | Aug. 3, 1920 |